United States Patent [19]

Halmai

[11] 4,427,908
[45] Jan. 24, 1984

[54] ELECTRICAL MACHINE WITH COMPRESSED AIR COOLING

[75] Inventor: Géza Halmai, Budapest, Hungary

[73] Assignee: Villamosipari Kutato Intezet, Budapest, Hungary

[21] Appl. No.: 320,687

[22] Filed: Nov. 12, 1981

Related U.S. Application Data

[63] Continuation of Ser. No. 61,314, Jul. 27, 1979, abandoned, which is a continuation of Ser. No. 870,254, Jan. 17, 1978, abandoned, which is a continuation of Ser. No. 680,969, Apr. 27, 1976, abandoned.

[30] Foreign Application Priority Data

Apr. 28, 1975 [HU] Hungary ............................. HA 985

[51] Int. Cl.³ .............................................. H02K 9/08
[52] U.S. Cl. ........................................ 310/57; 310/59; 310/61; 310/64; 310/86; 165/47; 165/139
[58] Field of Search ........................ 310/52, 55, 58, 57, 310/59, 60 R, 64, 65, 86, 260, 53, 270, 60 A, 61, 62, 63; 165/47, 139

[56] References Cited

U.S. PATENT DOCUMENTS

| | | | |
|---|---|---|---|
| 2,789,238 | 4/1957 | Staak | 310/57 |
| 2,951,954 | 9/1960 | Willyoung | 310/57 |
| 3,089,969 | 5/1963 | Wiedemann | 310/58 |
| 3,240,967 | 3/1968 | Krastchew | 310/55 |

FOREIGN PATENT DOCUMENTS 134466 12/1969 Czechoslovakia .................... 310/52

Primary Examiner—R. Skudy
Attorney, Agent, or Firm—Karl F. Ross; Herbert Dubno

[57] ABSTRACT

An electrical machine with compressed air cooling, the compressed air being circulated in a closed circuit. After having the compressed air heated by thermal losses of the electrical machine is cooled in the heat exchanger, it is led back into the machine. The compressed air is passed through the cooling channels between two layers of the armature winding heads, resulting in a steady thermal dissipation from the armature windings. Compared to the traditional machines the surface heat transmission factor —increasing due to the pressure—and steady cooling of the armature winding, enables the decrease of the mass of the machine per unit output.

1 Claim, 5 Drawing Figures

4,427,908

ELECTRICAL MACHINE WITH COMPRESSED AIR COOLING

CROSS REFERENCE TO RELATED APPLICATIONS

This application is a continuation of Ser. No. 61,314 filed July 27, 1979 as a continuation of Ser. No. 870,254 filed Jan. 17, 1978. The latter was a continuation of Ser. No. 680,969 filed Apr. 27, 1976. All of these earlier cases are now abandoned.

FIELD OF THE INVENTION

The invention relates to a rotary electrical machine, preferably for electrical vehicles, where cooling takes place by the aid of compressed air circulated within a closed path.

BACKGROUND OF THE INVENTION

From the point of view of the invention not only the vehicles driven by motors fed from a current collector or a primary electrical source (e.g. galvanic elements, thermoelements, storage batteries and fuel cells) are to be considered as electrical vehicles, but all vehicles with an electrical power transmission belong to this group: Diesel-electric vehicles are characteristic of this latter class.

Several systems are known, where exploitation of electrical machines has been increased by the use of a gaseous cooling media (DT No. 2 063 229); turbogenerators cooled by hydrogen under pressure (of several atmospheres) have been widely used. In these systems, however, the traditional structures for insulation of the armature windings and formation of the armature windings and formation of the armature winding heads have been maintained, restructing the possibility of complete exploitation of the increased cooling effect of the gas under pressure.

OBJECT OF THE INVENTION

The object of the invention is to exploit entirely the advantageous cooling and isolating properties of air under pressure—compared with electrical machines cooled with atmospherical air, thereby allowing—the mass of the machine with respect to the unit output to be significantly decreased (to one half or one-third). Besides, the main source of defects at the electrical vehicles, primarily at traction motors, namely penetration of contamination and humidity into the machine, can be prevented. Due to the significantly decreased mass per unit output—the machine according to the invention can be suitably used not only as a traction motor for electric cars of the future, but coupled to the heat engines presently used, for power transmission of railway and road vehicles.

SUMMARY OF THE INVENTION

The invention provides to an electrical machine with compressed air cooling, the compressed air being circulated in a closed circuit with the armature windings in contact with the compressed air; between the two layers of the double-layer armature winding heads there are cooling channels for the heated compressed air stream.

After the compressed air heated by the thermal losses of the electrical machine is cooled in the heat exchanger, it is led back into the electrical machine. By direct cooling of the winding heads the heat flow— transferred by the conductors from poorly cooling winding heads of the traction motors to the winding parts embedded in the easily cooling iron body—can be eliminated; consequently the electric density of the armature winding will increase too. While theoretically direct cooling of the winding heads by air under atmospheric pressure is also possible, the significantly greater cross-sections of the cooling channels which are necessary—compared to cooling with compressed air—result in rather burdensome constructions. (In order to throw light upon the facts enumerated above, I quote some numerical data—Sittkei. Qy: "Heat transmission and thermal load in internal combustion engines".

The surface heat transmission factor amounts to approx. 65 W/m$^2$ C.° for an electrical machine with atmospheric air cooling, where air flows with a velocity of 15 m/s (2.5 g/s) in a cooling channel $\phi$14 mm. The surface heat transmission factor amounts to approx. 420 W/m$^2$ C° for an electrical machine with compressed air cooling (pressure 1 MN/m$^2$), where air flows with a velocity of 12 m/s (2.5 g/s) in a cooling channel $\phi$5 mm.

The water-side surface heat transmission factor amounts to approx. 3000 W/m$^2$ C.° for internal combustion engines with water cooling.)

SPECIFIC DESCRIPTION

Figure 1:
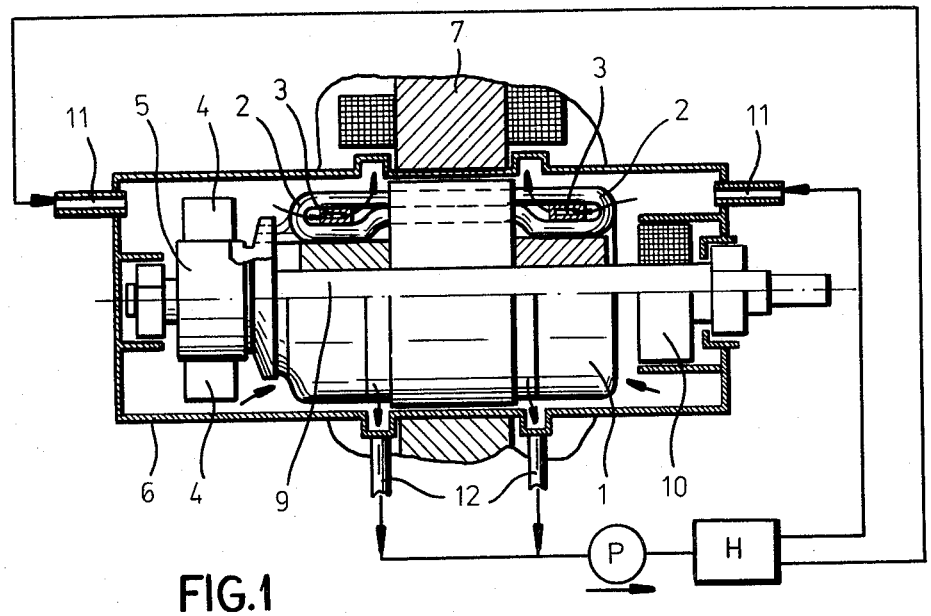
FIG. 1 is an axial section diagrammatically illustrating the invention.

FIG. 1 shows a preferred embodiment of the invention. In this case the electrical machine is represented by a commutator d.c. machine, the armature winding 1 of which is arranged on the rotor. The tubular cooling insets 3', forming the cooling channels 3 are placed within the double-layer armature winding heads 2.

In the embodiment described here, the entire rotor (together with the sliding current-carrying system, i.e. the brushes 4 and the commutator 5) is located in a space filled with compressed air. The rotor is contained in the pressure-tight case 6. The magnetic system 7 forming the main and auxiliary poles, is placed outside the case 6. The rotating shaft 9 is led from the pressurised space at the sealing 10.

The arrangement according to FIG. 1 is based on the perception that the more dense cooling medium—contrasting to the general opinion of the experts—does not increase the air friction losses to such an extent, that the more advantageous cooling with compressed air could not compensate an eventual decrease of efficiency; compared to the traditional solution, due to the increase armature current density the rotor is formed with a significantly smaller diameter, causing the decrease of the air friction output.

Compressed air enters through the inlets 11 and leaves the armature space through the outlets 12 adjacent the crown 14 towards the heat exchanger H connected to the inlets 11 and the outlets 12 for circulating compressed air in a closed path through the case 6 and the channels 15 and in direct contact with the windings for cooling same.

Figures 2, 2B:
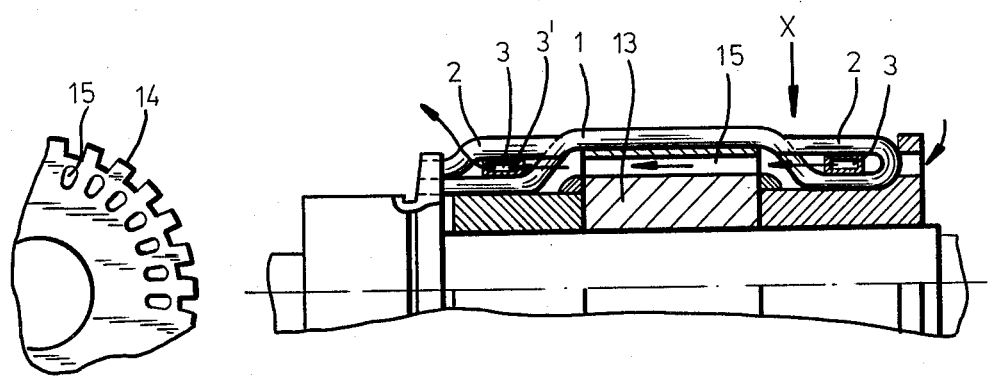
FIG. 2 is a longitudinal section through another embodiment.
FIGS. 2A to FIGS. 2C are detail views of the windings and their passages.
Figure 2C:
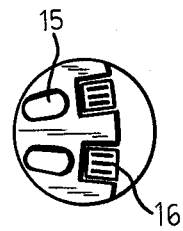
Figure 2A:
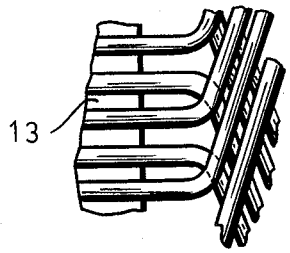

A further embodiment of the invention is shown in FIG. 2; here the cooling channels 3 formed in the winding heads 2 are continued in the axial cooling channels 15 formed in the iron body 13, between the conductors 16 FIG. 2C and the crown 14 FIG. 2B serving for the conduction of the magnetic flux. In FIG. 2 the variation is shown at which the armature winding 1 on the iron body is formed with one single layer.

A further embodiment of the invention can be characterised in that not only the armature winding and the compressed air are contacting each other, but the magnetic system (exciting circuit) of the electrical machines is also located in a pressurised space.

The invention does not exclusively relate to the d.c. machine described but to any other commutator-, synchronous-, or asynchronous machine provided with double-layer armature winding heads; in case of an asynchronous machine by the magnetic system a rotor is meant.

The presence of the insets between the double-layer armature winding heads does not form the prerequisite for realising the invention, a cavity between the two layers of the winding heads will also form the cooling channels.

When compared to the traditional solutions, it becomes obvious that the invention enables an equal thermal load on all sections of the armature winding, consequently the mass of the machine, related to the output unity will decrease, simultaneously the known advantages of cooling with compressed air also appear. The advantages are as follows:

After having pressurised the cooling circuit, leakage losses are to be replaced only. In respect of operation replacement can be performed more easily, than at cooling with hydrogen. On vehicles to be reckoned with e.g. locomotives, railway motors, motorcars, busses, lorries, compressed air is available for the operation of existing auxiliary equipments.

Due to the higher pressure, the diameter of the pipelines leading to the heat exchanger—provided, the steaming losses are identical—can be smaller, then at air cooling under atmospherical pressure.

Owing to the higher pressure, the surface heat transmission factor will be also higher, increasing by the $0.6-0.8^{th}$ power of the pressure.

On the fins the laminar boundary layer is thinner, thus a closer fin pitch may be applied.

Electrical strength of compressed air is higher, than that of atmospherical air.

Advantageously, the closed circuit is incorporating an air filter; the air volume streaming through the filter during the unity of time will be less—in proportion to the pressure—, than when cooling with atmospherical air. When using a machine with brushes, the air filter prevents contaminants produced by the brushes from penetrating into the machine.

Within the closed circuit advantageous conditions being independent of the weather can be established for the patina-forming on the commutator and the sliding ring.

At a given quantity of heat to be transferred less output is required for the circulation of the cooling air, then at cooling with atmospherical air. The output requirement for circulation amounts to $$P = \frac{8\, P^3_{loss}}{\pi^2 \cdot g^2 C^3_p \theta^3 \cdot a^4 \cdot \eta_v}\left(2\frac{c}{d} + \Sigma\xi\right)$$

where:
$P_{loss}$ = wasted power to be conducted
$a$ = air density
$C_P$ = specific heat of the air under constant pressure
$v$ = overheating of cooling air
$d$ = diameter of the pipe line
$\eta$ = efficiency of the circulating pump
$e$ = length of the pipe line
$\lambda$ = friction coefficient
$\xi$ = resistance factors As it is to be seen, the electrical machine can be expediently used for the drive of vehicles; the economical advantages resulting from the decreased mass and indifference to environmental effects are compensating to a considerable extent an eventual decrease of efficiency.

What we claim:

1. An electrical machine comprising:
   an armature formed with an iron body having a crown around a periphery thereof and windings lying in said crown with heads disposed on opposite axial sides of said crown, each of said heads being formed with a winding loop defining an inner layer and an outer layer radially spaced from said inner layer;
   respective tubular insets received in said heads and forming axially extending cooling channels therein;
   a pressure-tight case enclosing said armature and having axially opposite portions to either side of said crown;
   respective compressed air outlets connected to said case at said portions adjacent said crown;
   respective compressed air inlets, opening into opposite ends of said case for a connection to compressed air, the outlets being connected to a heat exchanger;
   magnet poles surrounding said case between said portions and juxtaposed with said crown to cooperate with said armature and develop electromotive forces rotating said armature;
   a sealing at one end of said case, said armature having a shaft extending from said case through said sealing; and
   means including said heat exchanger connected to said inlets and said outlets for circulating compressed air in a closed path through said case and the channels and in direct contact with said windings for cooling same.

* * * * *